Jan. 6, 1959
A. RODER
2,867,298
TELESCOPIC SHOCK ABSORBER
Filed Oct. 12, 1956
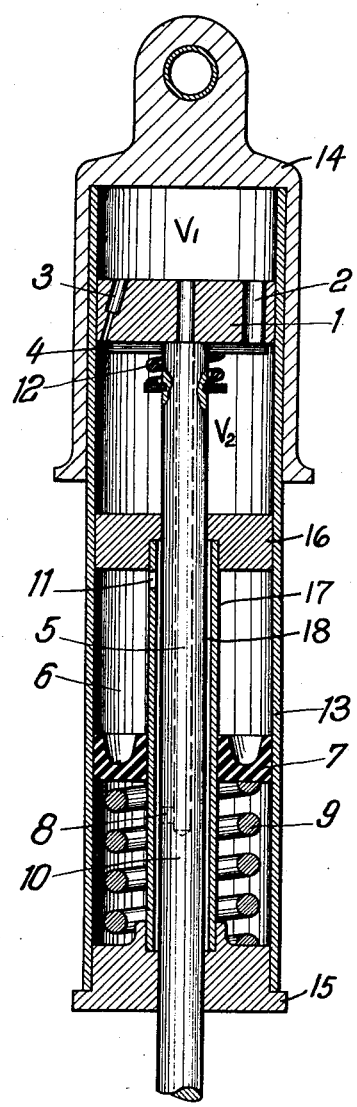
Inventor:
A. Roder
By Glascock Downing Seebold
Attys.

United States Patent Office 2,867,298
Patented Jan. 6, 1959

2,867,298

TELESCOPIC SHOCK ABSORBER

Albert Roder, Heilbronn, Neckar, Germany, assignor to NSU Werke Aktiengesellschaft, Neckarsulm, Wurttemberg, Germany Application October 12, 1956, Serial No. 615,616

Claims priority, application Germany October 15, 1955

4 Claims. (Cl. 188—88)

The present invention relates to a telescopic shock absorber for vehicles, more particularly motor vehicles. All the more recent types of telescopic shock absorber for motor vehicles are in principle of two types.

In one of these two types the cylinder is surrounded by an annular storage chamber from which leakage losses that occur in the course of time and repeated operation are replenished, and which also serves to compensate for any changes in volume due to the displacement of the piston.

The second type comprises the form of construction sometimes referred to as a single-tube shock absorber in which the changes in volume due to the movement of the piston rod are compensated for by spring-loading the piston so as to maintain the pressure medium under pressure.

The first type affords the advantage that the seal of the high pressure compartment separates the latter from the storage chamber so that any leakage is discharged into the storage chamber. On the other hand, this type suffers from the disadvantage that the liquid in the storage vessel is not pressurised for returning the medium into the cylinder through a bottom valve and thereby maintaining the shock absorber in working order.

On the other hand, single-tube shock absorbers suffer from the disadvantage that the seal of the high pressure compartment is an outside seal so that leakage losses will sooner or later put the shock absorber out of action.

The present invention relates to a shock absorber of the single-tube type and which therefore permits a large piston diameter to be used for a given overall diameter, because no space is required for an annular compensation chamber. Hence, working pressures may be reduced, since a relatively large volume of liquid can be made available for the absorption of shocks.

On the other hand, leakage losses in a shock absorber according to the invention are collected in a storage chamber which communicates with the low pressure chamber of the shock absorber.

Moreover, this storage chamber is in permanent communication with the low pressure chamber of the shock absorber and the oil in the storage chamber is continuously maintained under pressure by a spring load or alternatively by a pressurised gas cushion. Consequently, when the shock absorber heats up, the creation of vapor bubbles cannot impair the efficiency of the shock absorber. Furthermore, the provision of a bottom valve which is necessary in two-tube type shock absorbers and tends to give trouble, is not required.

Further and more specific objects will be apparent from the accompanying drawing which illustrates one embodiment of the invention partly in longitudinal section and with the piston rod in elevation.

The shock absorber illustrated includes a cylindrical casing 13 closed at one end by a closure member 14 which has an attaching lug adapted to be mounted to a part of a vehicle. The other end of the cylinder receives a bored closure plug 15. A bored partition 16 divides the interior of the cylinder into two portions. The upper portion accommodates the piston 1 that is provided with ports or bores 2 and 3 through which fluid is displaced, in response to movement of the piston due to shock, from one side of the piston to the other. The chambers adjacent the opposite faces of the piston are denoted as $V_1$ and $V_2$. The bore or port 3 is restricted on that end that communicates with chamber $V_2$ and a flap valve 4 is spring pressed to close port or bore 2 by spring 12. This valve, however, opens when the piston moves toward the end closure 14, and is closed on reverse movement of the piston. The piston rod 10 extends through partition 16 and the bore in end cap 15 and is adapted to be connected to another vehicle part. A sleeve element 17 having a greater diameter than that of the piston rod, surrounds the piston rod and extends between the interior of cap 15 and the partition 16. The space 6 beneath partition 16 constitutes a storage chamber for liquid. This storage chamber is in permanent communication with the space $V_1$ above the piston by way of a longitudinal bore 5 that extends through the piston 1, is continued in the piston rod 10 and communicates with a transverse bore 8 that opens into the annular space 18 between the exterior of the piston rod and the interior of the sleeve 17. The sleeve 17 has one or more transverse bores 11 adjacent partition 16 providing communication between the annular space 18 and chamber 6. An annular piston 7 seals off the lower part of storage chamber 6. This piston 7 is preferably a rubber piston and has lipped edges to effectively seal against the exterior of the sleeve 17 and the interior of cylinder 13. A helical spring 9 is biased between the interior of end cap 15 and the undersurface of annular piston 7 so as to provide a pressure load acting on the oil or fluid in storage chamber 6.

If desired, this pressure load can be obtained by a pressurized gas cushion.

In the operation of the shock absorber, piston rod 10 and thus piston 1 is displaced upwardly, the oil flowing from space $V_1$ through bores 2 and 3 into space $V_2$. Since the space $V_2$ that accommodates the piston rod has a volumetric capacity smaller by the volume of the piston rod than space $V_1$, a portion of the oil from space $V_1$ flows through bores 5, 8, annular space 18 and bore 11 into the storage chamber and displaces piston 7 downwardly against the action of the spring 9. During reverse stroke the piston 1 moves downwards, flap valve 4 closes bore 2 and oil flows from space $V_2$ into space $V_1$ through bore 3. Since one end of this bore is restricted, the flow of oil into space $V_1$ is throttled and the desired damping effect is obtained. Since the volumetric capacity of space $V_1$ is larger by the volume of the piston rod than space $V_2$, a part of the oil from chamber 6 is pressed by the upward movement of piston 7 due to spring 9 through bores 11, 8 and 5 into space $V_1$. Any leakage losses along the piston rod out of space $V_2$ will be collected in the annular space 18.

It is clear, therefore, that during the operation of the piston displaced oil is temporarily forced into chamber 6, and the advantages set forth in the preamble of the specification are obtained.

What is claimed is:

1. In a shock absorber, a cylinder, means separating the interior of the cylinder into a piston accommodating portion and a storage chamber portion, a piston reciprocable in said piston accommodating portion and having ports therethrough permitting displacement of fluid from one side of the piston to the other, a piston rod extending from one face of the piston through the storage chamber portion and exteriorly of the cylinder, a sleeve element within the storage chamber portion, surrounding the piston rod and having a transverse dimension greater than the transverse dimension of the piston rod so as to define an annular space between the exterior of the piston rod and the interior of the sleeve element, at least one port in the sleeve element providing communication between the storage chamber portion and said annular space, said piston and rod having duct means therethrough providing constant uninterrupted communication between the said annular space and that portion of the cylinder adjacent the face of the piston that is remote from the storage chamber and which constitutes the low pressure compartment of the cylinder, and means applying resilient pressure to the interior of the storage chamber whereby when the piston moves in a direction away from the storage chamber, a quantity of fluid is displaced into the storage chamber and upon reverse movement of the piston a quantity of fluid is returned from the storage chamber into the low pressure compartment of the cylinder.

2. In a shock absorber as claimed in claim 1 and the means applying a pressure to the storage chamber comprising an annular piston in sealing relation with the exterior of the sleeve and the interior of the cylinder and resilient means normally biasing said annular piston to move in a direction toward the piston accommodating portion of the cylinder.

3. In a shock absorber as claimed in claim 2 and said annular piston being of elastic material and having sealing lips in respective contact with the exterior of the sleeve element and the interior of the cylinder.

4. In a shock absorber as claimed in claim 1 and the ports through the piston comprising a first port and a second port having a restricted end on that side of the piston adjacent the storage chamber and a non-return valve closing that end of the first port that is adjacent the storage chamber and adapted to open in response to movement of the piston in a direction away from the storage chamber.

References Cited in the file of this patent

UNITED STATES PATENTS

| | | |
|---|---|---|
| 1,164,371 | Lovejoy | Dec. 14, 1915 |
| 1,387,081 | Springer | Aug. 9, 1921 |
| 1,434,197 | Brown | Oct. 31, 1922 |
| 1,825,233 | Joyce | Sept. 29, 1931 |
| 2,342,381 | Thornhill | Feb. 22, 1944 |
| 2,735,670 | Schultze | Feb. 21, 1956 |
| 2,808,904 | O'Connor et al. | Oct. 8, 1957 |

FOREIGN PATENTS

| | | |
|---|---|---|
| 1,069,114 | France | Feb. 10, 1954 |